US008693535B2

United States Patent
Yang

(10) Patent No.: US 8,693,535 B2
(45) Date of Patent: *Apr. 8, 2014

(54) METHOD AND APPARATUS FOR BIT ALLOCATION IN OFFLINE VIDEO CODING

(75) Inventor: Hua Yang, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 461 days.

This patent is subject to a terminal disclaimer.

(21) Appl. No.: 12/928,305

(22) Filed: Dec. 8, 2010

(65) Prior Publication Data

US 2011/0310963 A1 Dec. 22, 2011

Related U.S. Application Data

(60) Provisional application No. 61/284,151, filed on Dec. 14, 2009, provisional application No. 61/284,147, filed on Dec. 14, 2009.

(51) Int. Cl.
*H04N 7/12* (2006.01)
(52) U.S. Cl.
USPC ...................... 375/240.03; 382/251
(58) Field of Classification Search
USPC .................................................. 375/240.03
See application file for complete search history.

(56) References Cited

U.S. PATENT DOCUMENTS

| | | | | |
|---|---|---|---|---|
| 6,782,135 | B1* | 8/2004 | Viscito et al. | 382/239 |
| 2007/0116126 | A1* | 5/2007 | Haskell et al. | 375/240.21 |
| 2007/0280349 | A1* | 12/2007 | Prieto et al. | 375/240.03 |
| 2008/0063051 | A1* | 3/2008 | Kwon et al. | 375/240.03 |

OTHER PUBLICATIONS

Ramchandran et al., "Bit Allocation for Dependent Quantization with Applications to Multiresolution and MPEG Video Coders", IEEE Transactions on Image Processing, vol. 3, No. 5, Sep. 1994.
Tang, "Spatiotemporal Visual Considerations for Video Coding", IEEE Transactions on Multimedia, vol. 9, No. 2, Feb. 2007.
Llee et al., "Temporally Adaptive Motion Interpolation Exploiting Temporal Masking in Visual Perception", IEEE Transactions on Image Processing, vol. 3, No. 5, Sep. 1994.
Lele et al., "Spatiotemporal Adaptive Quantization for an Efficient Video Rate Control", 2005 SPIE, Optical Engineering, vol. 44, Jun. 2005.
Puri et al., "Motion-Compensated Video Coding with Adaptive Perceptual Quantiation", IEEE Transactions on Circuits and Systems for Video Technology, vol. 1, No. 4, Dec. 1991.

\* cited by examiner

*Primary Examiner* — Jay Patel
*Assistant Examiner* — Jessica Prince
(74) *Attorney, Agent, or Firm* — Robert D. Shedd; Vincent E. Duffy; James McKenzie

(57) ABSTRACT

The method and apparatus for offline video coding, as described herein, calculates per-frame QP offset contribution from the amount of temporal masking effect at a frame, and then properly combines the calculated per-frame QP offset contribution with the original QP offset contribution from the frame type. The resulting frame-level QP offset accounts for both the frame type and temporal masking effect, and hence, is more comprehensive.

16 Claims, 2 Drawing Sheets

METHOD AND APPARATUS FOR BIT ALLOCATION IN OFFLINE VIDEO CODING

CROSS REFERENCE TO RELATED APPLICATIONS

This application claims priority from U.S. Provisional Application Ser. No. 61/284,151 filed Dec. 14, 2009 and U.S. Provisional Application Ser. No. 61/284,147 filed Dec. 14, 2009, both of which are incorporated by reference herein in their entirety.

TECHNICAL FIELD

The present invention relates to video coding. More particularly, it relates to bit allocation in offline video coding.

BACKGROUND

Compared to online, or real-time video coding, offline, or non-real-time video coding has two major advantages on coding: (i) the whole video clip or sequence is available in advance, and (ii) no stringent coding time constraint. The $1^{st}$ advantage implies joint, or global, optimization of coding of all the frames altogether, i.e. globally optimized FBA, and the $2^{nd}$ advantage implies that encoding of a clip can be conducted multiple times, or passes. Both will lead to greatly improved overall video coding performance.

At least one implementation described herein addresses an important problem in sequence-wise globally optimized FBA for offline video coding, i.e. frame-level QP offset calculation. In most recent rate control solutions, accurate R-QP modeling is a commonly adopted approach for carrying out effective GOP-, frame-, and MB-level bit allocations. In the case of FBA, the general optimization objective is to achieve constant coding quality for all the concerned frames while satisfying the total bit budget constraint and specific buffer constraint. Usually, to fulfill the constant quality request, a same value of QP will be assumed for all the frames when calculating their respective allocated bits. Moreover, a particular QP offset has to be calculated for each frame respectively to guarantee a good overall coding performance at last.

SUMMARY

The method for offline video coding, as described herein, calculates per-frame QP offset contribution from the amount of temporal masking effect at a frame, and then properly combines the calculated per-frame QP offset contribution with the original QP offset contribution from the frame type. The resulting frame-level QP offset accounts for both the frame type and temporal masking effect, and hence, is more comprehensive.

According to an implementation, the method for bit allocation includes receiving a video sequence having at least one frame calculating per-frame QP offset contribution from an amount of temporal masking effect at a frame ($\Delta QP_{Masking}$); combining the calculated $\Delta QP_{Masking}$ Masking with a QP offset contribution obtained from the frame type ($\Delta QP_{Type}$), and encoding the video sequence using a bit rate obtained using the combined calculated $\Delta QP_{Masking}$ with a QP offset contribution obtained from the frame type ($\Delta QP_{Type}$).

These and other aspects, features and advantages of the present invention will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
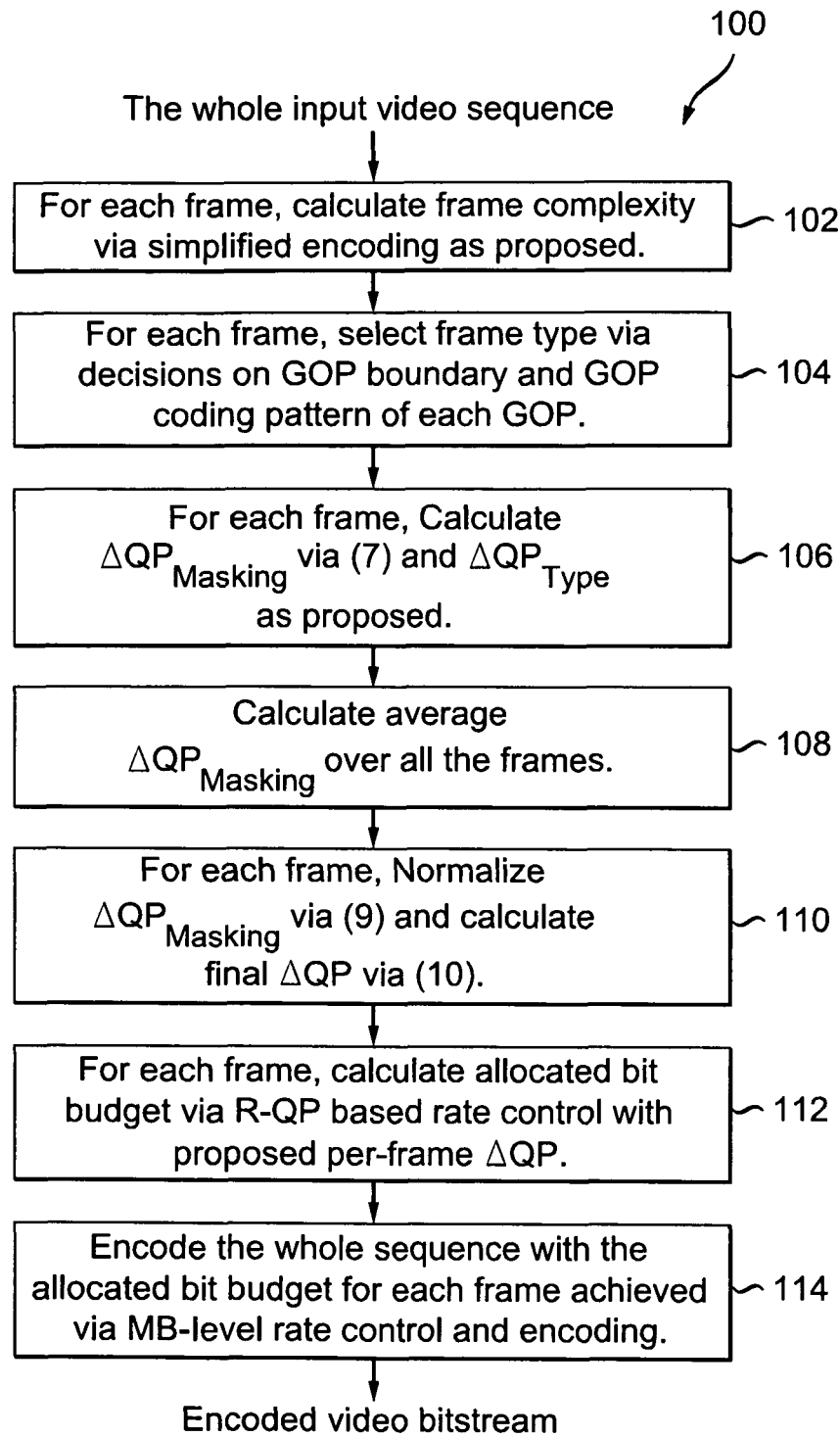
FIG. 1 is an exemplary flow diagram of the encoding process of a whole video segment using the perceptual frame-level QP offset in globally optimized R-QP model based frame-level bit allocation, according to an embodiment of the invention.

The present invention is directed to offline video coding, and more particularly to bit allocation in offline or non real-time video coding.

The present description illustrates the present invention. It will thus be appreciated that those skilled in the art will be able to devise various arrangements that, although not explicitly described or shown herein, embody the present invention and are included within its spirit and scope.

All examples and conditional language recited herein are intended for pedagogical purposes to aid the reader in understanding the present invention and the concepts contributed by the inventor(s) to furthering the art, and are to be construed as being without limitation to such specifically recited examples and conditions.

Moreover, all statements herein reciting principles, aspects, and embodiments of the present invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

According to an embodiment of the invention, there is provided an effective solution to calculate per-frame quantization parameter (QP) offset for frame-level bit allocation (FBA) in offline, or non-real time video coding. Hence, effective frame-level QP offset is important to guarantee good overall frame-level rate control performance.

One commonly known reason for per-frame QP offset is the so called monotonicity property. As has been widely recognized, this property indicates that a better quality in the reference frame (I- and P-frame) will lead to a better total coding efficiency. Accordingly, a widely proven useful and hence adopted practice is to apply the following relationship:

$$QP_I < QP_P < QP_B. \quad (1)$$

where $QP_I$, $QP_P$, and $QP_B$ denote QP of I-, P- and B-frame, respectively. According to an embodiment of the present invention for the formulation of rate control with constant frame QP (as mentioned above), the ultimate QP of a frame is the summation of the assumed constant QP (i.e., same for all frames) with that frame's particular QP offset. In this case, the preferred QP offset for each frame type is equivalently:

$$\Delta QP_I < \Delta QP_P < \Delta QP_B. \quad (2)$$

where $\Delta QP_I$, $\Delta QP_P$, and $\Delta QP_B$ denote QP offset of I-, P- and B-frame, respectively.

In at least one implementation, another important factor for frame-level QP offset calculation is identified, (i.e., the well known temporal or motion masking effect of human visual systems (HVS)). Basically, human eyes are less sensitive to quality degradations of high motion frames than to low motion frames. As such, smaller QPs should be applied to high motion frames than that for low motion frames, due to their higher temporal masking effect, while the same level of perceptual quality can still be perceived in the coded video.

The present invention proposes a scheme to effectively calculate per-frame QP offset contribution from the amount of temporal masking effect at a frame, and then, properly combine that with the original QP offset contribution from frame type. The resultant frame-level QP offset accounts for both the frame type and temporal masking effect, and hence, is more comprehensive. The proposed scheme is fine tuned for FBA of a whole video clip or sequence in offline video coding. In spite of this, the approach is generally applicable to online real-time video coding as well, with various degrees of quality improvement depending on the involved look-ahead time. Extensive experiments have demonstrated that accounting for temporal masking effect into per-frame QP offset is more necessary and critical than the frame type factor to guarantee significant visual quality improvement from the global optimized FBA in offline video coding.

Most rate control schemes for either online or offline video coding only account for the frame type factor in FBA, but not any impact from HVS masking effect at all. Hence, in the offline coding case, even if their objective coding efficiency measured in average PSNR can be significantly improved over online coding via FBA of frame-type based per-frame QP offset, significant perceptual quality improvement still cannot be observed. In experimentations, the inventors have found that: in this case, due to the global optimization of all frames' bit allocation of a sequence, high motion frames are allocated and coded with more bits than they are in the case of online coding. In the online coding case, bits are first allocated to each GOP, and in order to guarantee constant bit rate (CBR), the allocated bits of a GOP are proportional to the involved number of frames, i.e. GOP size, only, but not affected by their different coding complexity, e.g. high or low motions, etc. Therefore, in the offline coding case, given more bits, high motion frames are coded with higher PSNRs than they are in online coding. On the other hand, since the total amount of bits is the same, low motion frames are coded with lower PSNRs. The PSNR variations are indeed greatly reduced in this case. However, more constant PSNR does not mean more constant perceptual quality. Due to the HVS temporal masking effect, the high motion frame PSNR gains are much less perceivable than the low motion frame PSNR drops. Thus, the overall perceptual quality is, more often than not, worse than that of online coding. As such, the present invention identifies that considering temporal masking effect in global FBA of a whole clip is necessary and critical for perceptual quality enhancement.

We note that particular approaches that involve FBA accounting for temporal masking often have an underlying rate model that is either classification based or frame complexity based, which is not as accurate and general as the widely adopted R-QP modeling approach for rate control. Furthermore, their way of considering temporal masking is not via per-frame QP offset in FBA, and hence, cannot be applied for R-QP model based rate control solutions.

According to one embodiment, the present invention's perceptual frame-level QP offset approach is actually a proper combination of QP offset portion due to temporal masking, denoted by $\Delta QP_{Masking}$, and the portion due to frame type, denoted by $\Delta QP_{Type}$. This scheme is critical to render significant perceptual quality improvement of offline multi-pass coding over real-time single pass coding.

According to an embodiment, the present invention models the temporal masking effect with our frame complexity metric defined as follows.

$$Cmpl = \overline{R}_{mv} + \overline{MAD}(Inter\_pred\_residue\_MBs) \quad (3)$$

$$Cmpl = \max(0.1, Cmpl - 2) \quad (4)$$

where, Cmpl denotes the complexity of a frame. $\overline{R}_{mv}$ denotes the average MV coding bits per MB of the frame. $\overline{MAD}$ denotes the averaged mean-absolute-difference (MAD) of the prediction residue over all the MBs in a frame. Hence, their sum indeed represents the motion intensity of the current frame, which also equivalently signifies the coding complexity, and inter-frame change. The simple summation form in (3) is derived from good heuristics via extensive experiments.

In the encoder, $\overline{R}_{mv}$, $\overline{MAD}$, and hence, Cmpl are all computed based on original input frames before the encoding of a frame, and $\overline{MAD}$ only accounts for the Luma component. The calculation follows a simplified encoding process, including: only checking Inter16×16 and Intra16×16 mode, and only searching integer motion vectors.

Complexity of a frame, calculated from (3), is further constrained via (4). Because below 0.1, the prediction residue will be considered present due to inherent image noise, and hence, we set the minimum complexity as 0.1, which also serves to prevent possible "dividing with zero" errors. Also, we found that even with no any motion vector differences, the minimum average motion vector bits $\overline{R}_{mv}$ in (3) is still 2. Hence, this portion is always removed.

Note that herein the frame complexity is calculated for each frame via forward inter-frame prediction only, as the frame display or viewing order follows the forward direction. That is, for any frame, no matter its frame type (i.e., either I, P, or B-frames), we will just use the frame complexity calculated in (3) to measure its motion intensity, and hence, its motion masking effect.

Our perceptual frame-level QP offset approach is as follows. As can be seen from equation (10) below, that it is actually a proper combination of QP offset portion due to temporal masking, denoted by $\Delta QP_{Masking}$, and the portion due to frame type, denoted by $\Delta QP_{Type}$. This scheme is critical to render significant perceptual quality improvement of offline multi-pass coding over real-time single pass coding.

Calculate $\Delta QP_{Masking}$: for frame n:

$$Compl_{Masking}(n) = \frac{1}{2K+1}\sum_{i=n-K}^{n+K} Compl(i). \quad (5)$$

If frame n is a scene-change frame, instead of (5):

$$Compl_{Masking}(n) = \frac{1}{K+1}\left(\min(Compl_{max}, Compl(n)) + \sum_{i=n+1}^{n+K} Compl(i)\right) \quad (6)$$

$$\Delta QP_{Masking}(n) = a \cdot Compl_{Masking}(n) \quad (7)$$

$$\overline{\Delta QP_{Masking}} = \frac{1}{N}\sum_{i=1}^{N} \Delta QP_{Masking}(i) \quad (8)$$

$$\Delta QP_{Masking}(n) = \min(\Delta QP_{masking,max},$$
$$\max(\Delta QP_{Masking,min}, \Delta QP_{Masking}(n) - \overline{\Delta QP_{Masking}})). \quad (9)$$

Here, K=1. 2K+1=3 is the window size. $Compl_{max}$=40. a=0.5. N denotes total number of frames in the video clip. $\Delta QP_{Masking,max}$=8, $\Delta QP_{Masking,max}$=−8, Calculate $\Delta QP_{Type}$: for frame n:

If I-frame:
  If GOPSize = 1   → $\Delta QP_{Type}(n) = 0$.
  Else if GOPSize ≤ 10
  {
    If GOPAvgCompl < 6   → $\Delta QP_{Type}(n) = -6$.
    Else if GOPAvgCompl < 14   → $\Delta QP_{Type}(n) = -4$.
    Else   → $\Delta QP_{Type}(n) = -2$.
  }
  Else
  {
    If GOPAvgCompl < 6   → $\Delta QP_{Type}(n) = -8$.
    Else if GOPAvgCompl < 14   → $\Delta QP_{Type}(n) = -6$.
    Else   → $\Delta QP_{Type}(n) = -4$.
  }
If P-frame:
  If it is used for prediction of B-frames   → $\Delta QP_{Type}(n) = -2$.
  Else   → $\Delta QP_{Type}(n) = 0$.
If B-frame: → $\Delta QP_{Type}(n) = +4$.

Herein, GOPAvgCompl is the average frame complexity of the current GOP excluding the $1^{st}$ I-frame.

Calculate final $\Delta QP$: for frame n:

$$\Delta QP(n) = \min(\Delta QP_{max}, \max(\Delta QP_{min}, \Delta QP_{Masking}(n) + \Delta QP_{Type}(n))). \quad (10)$$

Herein, $\Delta QP_{max}$=15, $\Delta QP_{min}$=−15.

In (5), temporal masking complexity of a frame is calculated as the average frame complexity of the current frame's neighboring frames in a certain size of window (i.e. 2K+1). This is to apply some low-pass filtering to avoid high dynamic change of the temporal masking complexity of a frame due to possible high dynamic change of frame complexity.

For a scene-change frame, its frame complexity will be very high. Hence, its temporal masking complexity is specially calculated as in (6), where a maximum constraint is applied for its frame complexity, and the averaging only applies to its forward neighboring frames in the same scene.

Given the temporal masking frame complexity, the portion of QP offset from temporal masking effect is calculated via linear mapping as in (7). This is derived from good heuristics, which works effectively with our complexity metric. $\Delta QP_{Masking}(n)$ from (7) is then normalized with the average $\Delta QP_{Masking}$, and bounded within a certain reasonable range, as shown in (9).

The $\Delta QP_{Type}$ calculation of the present invention embodies the heuristic rule as described in (2). Specifically, if a GOP has more frames, or if a GOP is of lower motion, more bits for the first I-frame in the GOP will be more preferred, as this will bring more coding efficiency benefit for the following frames in the GOP. Therefore, in these cases, a more negative QP offset will be desired, and vice versa.

The QP offset contributions from both the temporal masking effect and the frame type impact are then combined together via simple addition and bounding in (10). The resultant per-frame QP offset from (10) will then be used in an R-QP modeling based rate control solution to calculate allocated bits for every frame in a sequence, while assuming constant QP for constant quality in bit allocation.

A brief description of such a rate control solution for frame-level bit allocation is described as follows.

1. Search for the optimal QP, denoted as $QP_{Opt}$, s.t.

$$\min_{QP}\left|R_{Total} - \sum_{i=1}^{N} R_i(QP + \Delta QP_i)\right|. \quad (11)$$

2. Calculate allocated bit budget for each frame based on $QP_{Opt}$:

$$R_{i,alloc} = R_i(QP_{Opt} + \Delta QP_i). \quad (12)$$

Here, $R_{Total}$ denotes the total number of bits for the whole video sequence. N is the total number of frames in the video sequence. $R_i$ is the number of bits for frame i. $\Delta QP_i$ is the perceptual frame-level QP offset as calculated in (8). $R_{i,alloc}$ is the allocated number of bits for frame i.

An example of the process 100 of a whole video sequence using the perceptual frame-level QP offset in globally optimized R-QP model based frame-level bit allocation is illustrated in the flow diagram of FIG. 1. As shown, the whole input video sequence is received and for each frame, the frame complexity is calculated (102) using simplified encoding as described above (equations (3) and (4)). Then for each fame, the frame type is selected (104) using decisions on GOP boundary and GOP coding pattern of each GOP. Then, for each frame, the $\Delta QP_{Masking}$ is calculated (106) using equation (7) and the $\Delta QP_{Type}$ as discussed above. The Average $\Delta QP_{Masking}$ is then calculated (108) over all the frames. For each frame, $\Delta QP_{Masking}$ is normalized using equation (9) and calculate (110) the final $\Delta QP$ using equation (10). Using the calculated final $\Delta QP$, we then calculate (112), for each frame, the allocated bit budget using R-QP based rate control as described above with respect to equations (11) and (12). As this stage, the whole sequence is encoded (114) with the allocated bit budget for each frame achieved using the MB-level rate control and encoding.

Extensive experimental results show that: without considering the temporal masking effect, using $\Delta QP_{Type}$ only as frame QP offset, the globally optimized rate control with the whole sequence available as in equations (9) and (10) performs no better than the locally optimized rate control with only one current GOP available. However, with further considering the temporal masking effect as set forth in the embodiments of the invention, significant perceptual quality improvement can be achieved. Specifically, compared with GOP optimized rate control, our sequence optimized rate control with the proposed frame-level QP offset approach can achieve much better coding quality on: (i) low motion frames that are neighboring with high motion frames; and (ii) low motion short GOPs at the end of a scene, while a little worse quality on low motion GOPs. Overall, the visual experience of coded video is always better.

Figure 2:
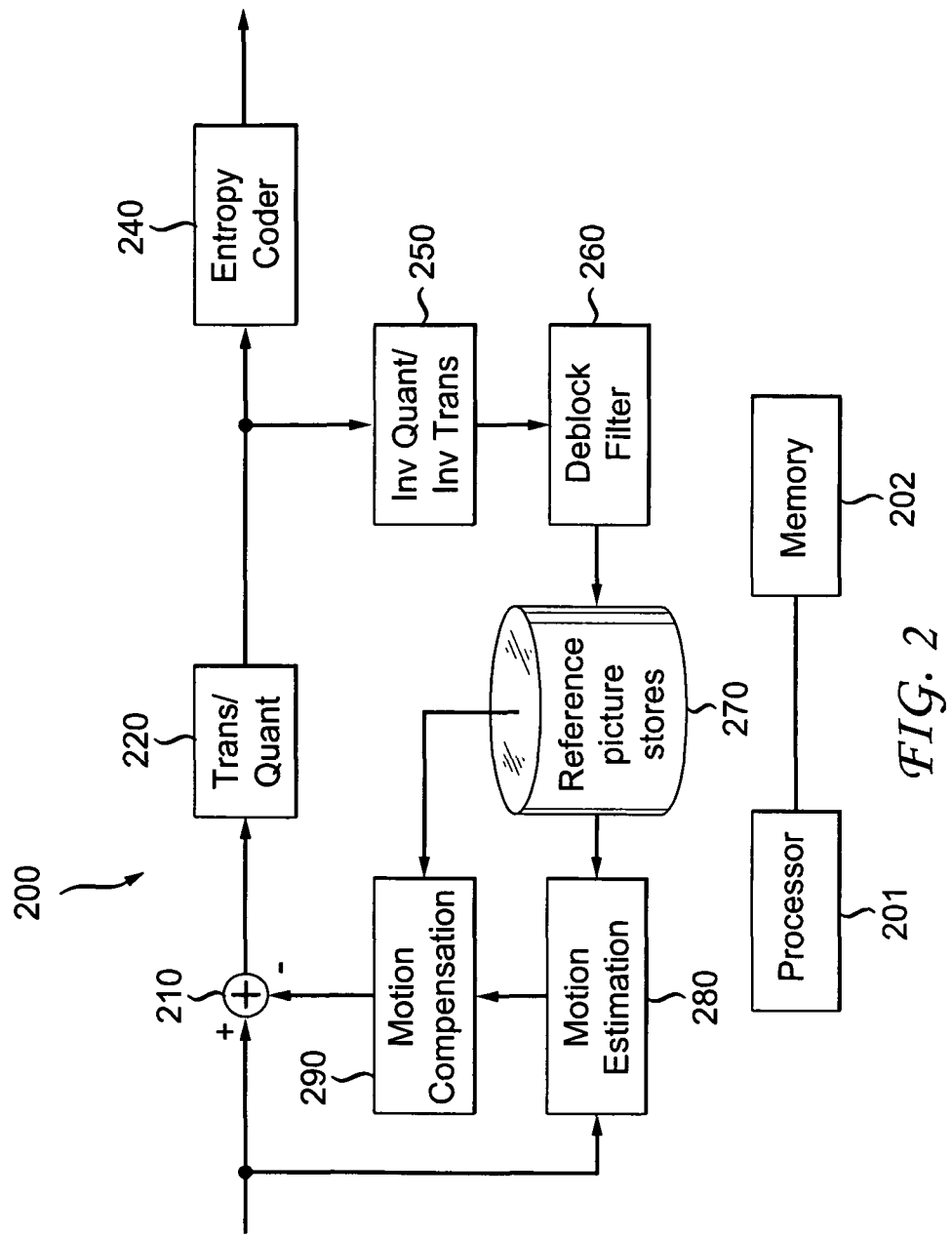
FIG. 2 is block diagram of an exemplary standard video encoder capable of implementing the bit allocation according to an embodiment of the invention.

FIG. 2 shows an block diagram of an exemplary video encoder 200 to which the present invention may be applied. Initially, we note that the processor 201 and memory 202 are in signal communication with all elements of the encoder and operate to control the same. An input to the video encoder 200 is connected in signal communication with a non-inverting input of a summing junction 210. The output of the summing junction 210 is connected in signal communication with a transformer/quantizer 220. The output of the transformer/quantizer 220 is connected in signal communication with an entropy coder 240. An output of the entropy 240 is available as an output of the encoder 200.

The output of the transformed/quantizer 220 is further connected in signal communication with an inverse transformer/quantizer 250. An output of the inverse transformer/quantizer 450 is connected in signal communication with an input of a deblock filter 260. An output of the deblock filter 260 is connected in signal communication with reference pictures stores 270. A first output of the reference picture stores 270 is connected in signal communication with a first input of a motion estimator 280. The input to the encoder 400 is further connected in signal communication with a second input of the motion estimator 280. The output of the motion estimator 280 is connected in signal communication with a first input of a motion compensator 290. A second output of the reference pictures stores 270 is connected in signal communication with a second input of the motion compensator 290. The output of the motion compensator is connected in signal communication with an inverting input of the summing junction 210.

Additional Implementations

Although the present invention is described in a general context of encoding, those of skill in the art will recognized that various features and aspects of the described implementations may also be adapted for other implementations.

For example, these implementations and features may be used in the context of coding video and/or coding other types of data. Additionally, these implementations and features may be used in the context of, or adapted for use in the context of, a standard. Several such standards are AVC, the extension of AVC for multi-view coding (MVC), the extension of AVC for scalable video coding (SVC), and the proposed MPEG/JVT standards for 3-D Video coding (3DV) and for High-Performance Video Coding (HVC), but other standards (existing or future) may be used. Of course, the implementations and features need not be used in a standard.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A method comprising the steps of:
receiving a video sequence having at least one frame;
calculating per-frame QP offset contribution from an amount of temporal masking effect at a frame ($\Delta QP_{Masking}$);
combining the calculated $\Delta QP_{Masking}$ with a QP offset contribution obtained from the frame type ($\Delta QP_{Type}$); and
encoding the video sequence using a bit rate obtained using the combined calculated $\Delta QP_{Masking}$ with a QP offset contribution obtained from the frame type ($\Delta QP_{Type}$).

2. The method of claim 1, further comprising the step of:
calculating frame complexity for each frame;
selecting frame type based on GOP boundary and GOP coding pattern for each GOP;
calculating the per frame QP-offset contribution based on frame type ($\Delta QP_{Type}$).

3. The method of claim 2, further comprising the steps of:
calculating an average $\Delta QP_{Masking}$ over all frames;
normalizing $\Delta QP_{Masking}$; and
calculating a final per frame $\Delta QP$.

4. The method of claim 3, further comprising:
calculating an allocated bit budget and rate control using the calculated final per frame $\Delta QP$.

5. The method of claim 1, wherein said calculating per-frame QP offset contribution from an amount of temporal masking effect at a frame ($\Delta QP_{Masking}$) is performed using $\Delta QP_{Masking}(n) = a \cdot Compl_{Masking}(n)$, where $a=0.5$ and $Compl_{masking}(n)$ comprises a temporal masking complexity of a frame calculated as an average of a current frame's neighboring frames in a predetermined size of window.

6. The method of claim 2, wherein said step of calculating frame complexity for each frame is performed using forward inter-frame prediction.

7. A computer program product comprising a non-transitory computer useable medium having a computer readable program, wherein the computer readable program when executed on a computer causes the computer to perform method steps for bit allocation in video encoding, including:
receiving a video sequence having at least one frame;
calculating per-frame QP offset contribution from an amount of temporal masking effect at a frame ($\Delta QP_{Masking}$);
combining the calculated $\Delta QP_{Masking}$ with a QP offset contribution obtained from the frame type ($\Delta QP_{Type}$); and
encoding the video sequence using a bit rate obtained using the combined calculated $\Delta QP_{Masking}$ with a QP offset contribution obtained from the frame type ($\Delta QP_{Type}$).

8. The computer program product as recited in claim 7, further including
calculating frame complexity for each frame;
selecting frame type based on GOP boundary and GOP coding pattern for each GOP;
calculating the per frame QP-offset contribution based on frame type ($\Delta QP_{Type}$).

9. The computer program product as recited in claim 8, further including:
calculating an average $\Delta QP_{Masking}$ over all frames;
normalizing $\Delta QP_{Masking}$; and
calculating a final per frame $\Delta QP$.

10. The computer program product as recited claim 9, further including:
calculating an allocated bit budget and rate control using the calculated final per frame $\Delta QP$.

11. The computer program product as recited claim 7, wherein said calculating per-frame QP offset contribution from an amount of temporal masking effect at a frame ($\Delta QP_{Masking}$) is performed
using $\Delta QP_{Masking}(n) = a \cdot Compl_{Masking}(n)$, where a=0.5 and $Compl_{Masking}(n)$ comprises a temporal masking complexity of a frame calculated as an average of a current frame's neighboring frames in a predetermined size of window.

12. An encoder for encoding video sequences, the encoder comprising
means for calculating per-frame QP offset contribution from an amount of temporal masking effect at a frame ($\Delta QP_{Masking}$);
means for combining the calculated $\Delta QP_{Masking}$ with a QP offset contribution obtained from the frame type ($\Delta QP_{Type}$); and
means for encoding the video sequence using a bit rate obtained using the combined calculated $\Delta QP_{Masking}$ with a QP offset contribution obtained from the frame type ($\Delta QP_{Type}$).

13. The encoder of claim 12, further comprising:
means for calculating frame complexity for each frame;
means for selecting frame type based on GOP boundary and GOP coding pattern for each GOP;
means for calculating the per frame QP-offset contribution based on frame type ($\Delta QP_{Type}$).

14. The encoder of claim 13, further comprising:
means for calculating an average $\Delta QP_{Masking}$ over all frames;
means for normalizing $\Delta QP_{Masking}$; and
means for calculating a final per frame $\Delta QP$.

15. The encoder of claim 14, further comprising:
means for calculating an allocated bit budget and rate control using the calculated final per frame $\Delta QP$.

16. The encoder of claim 12, wherein said means for calculating per-frame QP offset contribution from an amount of temporal masking effect at a frame ($\Delta QP_{Masking}$) further comprises applying the following
$\Delta QP_{Masking}(n) = a \cdot Compl_{Masking}(n)$, where a=0.5 and $Compl_{Masking}(n)$ comprises a temporal masking complexity of a frame calculated as an average of a current frame's neighboring frames in a predetermined size of window.

* * * * *